INVENTOR:
Walter Juda
by: [signature]
ATTORNEY

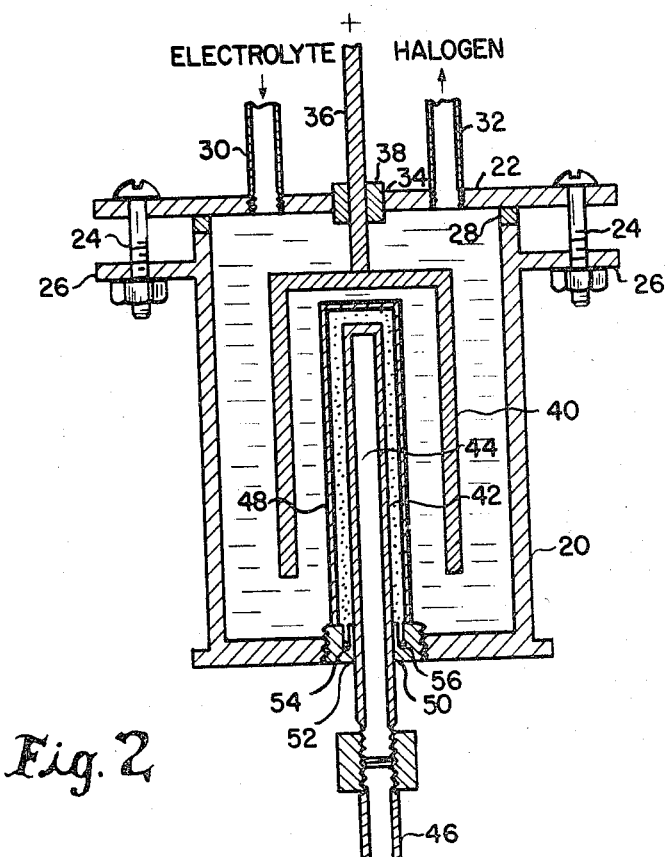
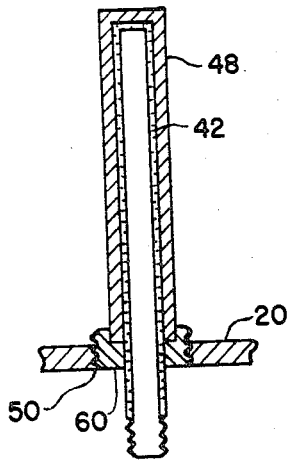

United States Patent Office 3,291,708
Patented Dec. 13, 1966

3,291,708
ELECTROLYTIC PROCESS FOR PRODUCING A HALOGEN FROM ITS RESPECTIVE ACID AND THE APPARATUS THEREFOR
Walter Juda, Lexington, Mass., assignor to Ionics, Incorporated, Cambridge, Mass.
Filed Dec. 31, 1964, Ser. No. 425,107
3 Claims. (Cl. 204—128)

This application is a continuation-in-part of copending application Serial No. 250,980, filed January 3, 1963 and now abandoned, which is a continuation of application Serial No. 94,735, filed March 10, 1961 and now abandoned, the latter being a continuation-in-part of application Serial No. 66,498, filed November 1, 1960, now Patent No. 3,117,066.

This invention relates to the electrochemical conversion of selected halogen acids to the corresponding halogens, and more particularly to improved electrolytic processes and apparatus for converting selected halogen acids to halogens through the use of electrical energy produced, at least in part, by an oxidation reaction.

Fuel cells, known in the art, can be characterized as electrochemical cells in which a substantial portion of the chemical energy of an oxidation-reduction reaction is converted directly to useful electrical energy. In an exemplary fuel cell, a fuel, such as hydrogen gas, and an oxidant, such as oxygen gas, are diffused respectively through a pair of porous, catalyzed electrodes separated by an electrolyte. The reaction of the fuel and oxidant creates electrical energy which is readily available at the electrodes.

The electrolysis of selected halogen acids, such as hydrogen chloride and hydrogen fluoride, to produce the respective halogen, is a well-known process. Typically, certain chlorination processes often produce large quantities of hydrogen chloride as a by-product, and the regeneration of the chlorine from the acid has recognized commercial significance. In regenerating the halogen by electrolysis, the acid gas is absorbed in water or in an aqueous solution of acid at low concentration, thereby producing a relatively concentrated acid solution. The latter is fed to electrolytic cells wherein it is decomposed into hydrogen and chlorine by the application of electrical energy to the cell. Because the cell requires complete separation of the gaseous products due to the inherent explosiveness of a mixture of the gases, the cell is often bulky and expensive. The hydrogen, too, is often an undesired product which nevertheless must be processed for recovering acid condensate therefrom, and this necessitates still further equipment.

The use of electrolytic cells for effecting electrochemical conversions with electrical energy derived, in part, from the reaction in the cell has been disclosed in U.S. Patents Nos. 3,124,520 of March 10, 1964, 3,103,474 of September 10, 1963, and 3,103,473 of September 10, 1963. In these disclosures, the anode process, i.e. the ionization of a fuel supplied to the anode, was employed to produce by direct conversion part of the energy consumed in the over-all process. In my abandoned U.S. patent application, Serial No. 8,269, filed February 12, 1960, part of the D.C. energy used in the chemical conversion of certain organic compounds was produced by a process at a porous cathode supplied with oxidant gas. Consequently, the present invention contemplates the employment of an oxidation reaction to directly produce electrical energy at cathodes in the chemical conversion of HCl to chlorine and HF to fluorine with the attendant reduction of outside power necessary for performing the process.

A principal object of the present invention is therefore to provide a process involving the employment of an oxidant reaction at the cathode in chemical conversion cells for producing selected halogens. Other objects of the present invention are to provide a process involving the employment of oxidant cathodes in chemical conversion cells for producing selected halogens; to provide a process involving the use of an oxidant couple, i.e. both the reduced and oxidized forms of an "ionic" species, in contact with a suitable electrically conductive cathode for producing electrical energy at the cathode in the chemical conversion of HCl to Cl and HF to F with the attendant reduction in external electrical power required for performing the process by prior art means.

Other objects of the present invention are to provide an improved electrolytic means for producing chlorine from hydrogen chloride without the evolution of gaseous hydrogen; to provide an improved electrolytic means for producing fluorine from hydrogen fluoride without the evolution of gaseous hydrogen; to provide means of the type described which is an improvement over the prior art in compactness, cost of construction, and cost of external electrical power required in its operation; and to provide an electrochemical apparatus for the conversion of selected halogen acids to the corresponding halogen, which apparatus employs catalytic, porous cathode means, and means for supplying oxidant gas to the cathode means during operation of the apparatus.

Other objects of the invention will in part be obvious and will in part appear hereinafter.

The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings in which:

FIGURE 1 is a schematic, sectional, side elevational view of an electrochemical conversion cell embodying the principles of the present invention;

FIGURE 2 is a schematic, sectional, side elevational view of an alternative cathode-barrier assembly for use in the embodiment of FIGURE 1.

Figure 3:
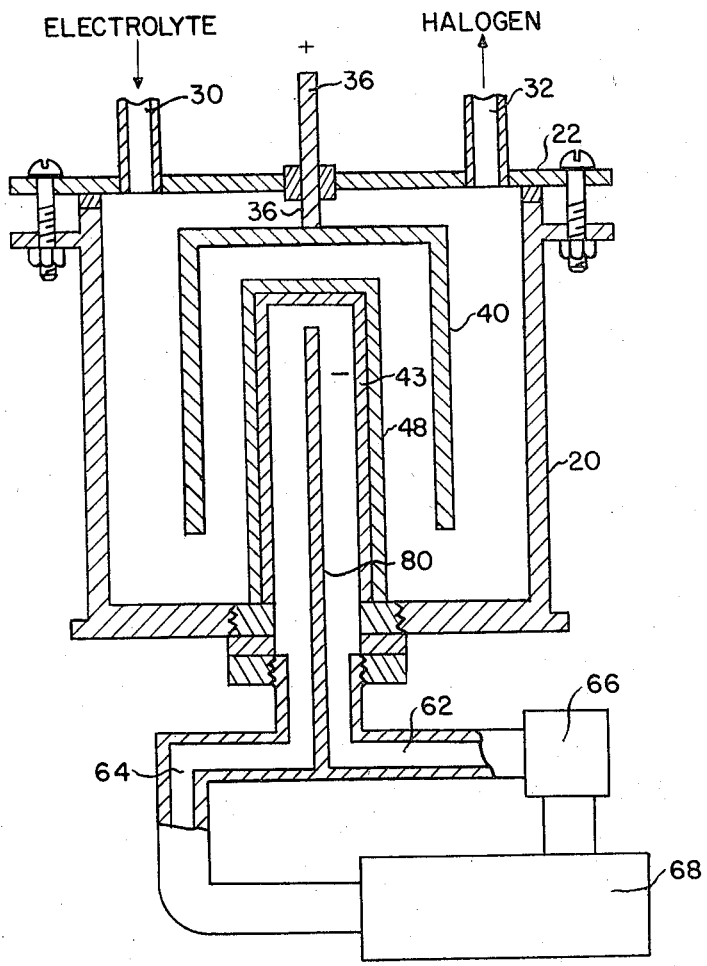
FIGURE 3 is a schematic, sectional, side elevational view of another embodiment of the invention.

Referring now to FIGURE 1, there is shown an exemplary cell for the electrochemical conversion of a selected halogen acid to its halogen. The cell, in the form shown, comprises a substantially hollow cylindrical container or cell body 20 which is preferably formed of a material which is not attacked, or attacked only superficially, by the electrolyte or the halogen. For instance, such metals as platinum, silver, "Monel" metal, nickel, magnesium, and copper may be employed as well as such other materials as graphite, polytetrafluorethylene, and the like. One end of the cell body 20 is capped with circular lid 22 which is firmly retained in a position of closure by appropriate fastening means, such as bolts 24, which connect an annular flange 26 about cell body 20 with peripheral portions of the lid. In order to provide a proper seat for the lid and to prevent the escape of corrosive materials from the interior of the cell body, one embodiment includes a gasket 28 between the lid and the cell body. The gasket may be formed of such materials as polytetrafluorethylene and polychlortrifluorethylene where the cell is to be employed for fluorine production, and of the aforesaid materials as well as polyvinylchloride and polychlorbutadiene where the cell is to be employed for chlorine production. The lid may include a plurality of openings therein into which ducting means such as tubes 30 and 32 are inserted. The former provides inlet means through which the electrolyte is intended to be introduced into the interior of the cell; the latter provides egress means through which the halogen is intended to be withdrawn from the cell.

Lid 22 also includes, approximately centrally thereof, aperture 34 through which extends anode support means which, in the form shown, comprises rod 36. Rod 36, being made of an electrically conductive material, also comprises means for carrying an electrical current to the anode. In the event that cell body 20 is also formed of an electrically conductive material, such as one of the metals heretofore mentioned, the rod is preferably insulated from the cell body by gasket 38. The latter is dimensioned to occupy the space between the rod and the internal margin of aperture 34 so as to provide a liquid- and gas-proof seal. Gasket 38 is preferably formed of the same materials as gasket 28; the choice of materials, of course, is determined by the nature of the halogen involved.

Suspended from the extremity of rod 36 which extends internally of cell body 20 and electrically coupled thereto is anode 40. In a preferred embodiment, the anode comprises a hollow, cylindrical or tubular element having a closed end which is firmly bonded to rod 36. The anode may be formed, for example, of graphite or carbon although other anode materials, such as nickel, platinum, copper, iron, platinized titanium, platinized tantalum, silicon carbide, magnesium, aluminum, other noble metals, or titanium and tantalum coated with other noble metals, or the like, may be used.

The apparatus of the invention includes cathode 42 which, in the form shown in FIGURE 1, is shaped as an elongated, cylindrical element, disposed coaxially with anode 40 within the hollow interior of the latter. The cathode is dimensioned so that its external diameter is substantially smaller than the internal diameter of anode 40 and is, therefore, predeterminedly spaced from the internal walls of the latter. In the form shown, the cathode includes an interior space or hollow axis 44 into which an oxidant gas, such as air, oxygen, ozone, etc., is intended to be introduced. Therefore, ducting means, such as tube 46, is coupled mechanically and electrically with hollow axis 44 thereby providing a pneumatic passageway or gas inlet port to the cathode. Tube 46 preferably is formed of an electrically conductive material thereby constituting means for carrying an electrical current to the cathode. Cathode 42 is a microporous, catalyzed body formed of suitable materials such as microporous carbon in graphite form having distributed therein catalytic metal, such as silver or gold, or other noble metals, including platinum, and mixtures thereof, or a sintered, microporous mat or grid of silver, gold, iridium, etc., alone or coated upon an electrolytic valve metal such as titanium, columbium, tantalum, and the like.

In order to avoid significant contamination by oxidant gas of the halogen evolved at the anode, and to avoid contamination of halogen acid by products evolved at the cathode, one form of the invention includes means for separating the electrodes from one another as by an ion-permeable barrier 48. In the embodiment shown in FIGURE 1, barrier 48 is shaped as a closed, tubular element positioned substantially coaxially with and between both the cathode and the anode, being predeterminedly spaced from both of the electrodes. In one form of the invention, barrier 48 is a selectively ion-permeable membrane. Examples of such ion-permeable membranes and methods for making the same can be found, for instance in U.S. Reissue Patent No. 24,865, issued September 6, 1960, to W. Juda et al., and in U.S. Patent No. 2,730,768, issued January 17, 1956, to J. Clarke. Included in such cationic-permeable membranes are, for example, sulfonated polystyrene, olefinic carboxylated divinyl benzene type membranes (U.S. Patent No. 2,731,408, issued January 17, 1956), etc. In cells wherein a membrane of the type described would too rapidly be rendered inoperative by chemical attack, barrier 48 comprises yet another structure, serving a similar purpose, for instance, a porous diaphragm of polyvinyl chloride, "Monel" metal, elektron-magnesium alloy, or the like. In the form shown in FIGURE 2, wherein like numerals denote like parts, the barrier takes the form of a selectively ion-permeable membrane positioned between the cathode and anode and in direct contact with cathode 42. This alternative form permits the efficient utilization of oxidant gases under relatively low pressures. The juxtaposed position of the membrane with the cathode permits the membrane to operate as an electrolyte, per se, therefore obviating the need for providing any additional electrical connection between the barrier and the cathode.

In the embodiment shown in FIGURE 1, cell body 20, at the end thereof opposite to the end capped by lid 22, is provided with a substantially circular opening 50 disposed approximately centrally thereof. Means such as ring 52 for supporting barrier 48 are provided, ring 52 being shaped to fit snugly, as by threading, into opening 50. Ring 52 includes a central aperture therein which is dimensioned to fit snugly about cathode 42, thereby providing a seal which separates the cathode from the cell body, retains the cathode in its coaxial position relative to the anode, and supports barrier 48 so that working electrolyte within the hollow interior of the cell body cannot contact the cathode. Ring 52 includes therein ducting means such as inlet port 54 and outlet port 56 through which respectively an ionic solution can be introduced and withdrawn from the interspace between the cathode and the barrier. Such an ionic solution provides the necessary initial electrical continuity between the cathode and the barrier.

Referring now to the embodiment illustrated in FIGURE 2, cell body 20, at the end thereof opposite to the end capped by lid 22, (shown in fragment) is provided with a substantially circular opening 50. Means such as ring 60 for supporting barrier 48 are provided, ring 60 being shaped similarly to ring 52 to fit snugly into opening 50. Ring 60 includes a central aperture therein which is dimensioned to fit snugly about cathode 42; the ring thus provides a seal which separates the cathode from the cell body and retains the cathode in its position relative to the anode. In this embodiment, barrier 48 comprises an ion-permselective membrane in intimate physical and electronic contact with the external surface of cathode 42 thereby separating the latter completely from the interior of the cell.

In operation, where it is desired to employ the cell of FIGURE 1, for instance for the manufacture of fluorine from hydrogen fluoride, a continuous supply of anhydrous hydrofluoric acid is fed into the interior of cell body 20 through inlet port 30 under slight pressure, or HF fed into the cell is maintained under continuous pressure. As its dissociation is very poor, pure HF is virtually non-conductive electrically. Hence, in order to increase considerably its conductivity, the hydrofluoric acid includes a small amount of HF-soluble fluorides such as potassium or ammonium fluoride, which dissociate to provide ions which conduct an electrical current. The operating temperature of the cell is determined by the requirement that the electrolyte remains liquid; the relative concentration of HF with respect to the fluorine salt determines, to a large extent, the optimum temperature at which the cell is to be operated. An oxidizing gas, such as oxygen, is fed through inlet port 46 into the internal cathode space 44. And, an ionic aqueous solution, for instance, water containing a small amount of sulfuric acid (which will not decompose readily while carrying an electrical current) is introduced through inlet port 54 into the interspace between cathode 42 and membrane 48. A direct electrical current from an external power source, such as a battery (not shown) is impressed upon the cell with the proper polarity through rod 36 and tube 46.

The oxygen is presumably adsorbed on the surface of the cathode and catalyzed to produce hydroxyl ions at the electrode-solution interface. Simultaneously, the passage of direct current through the cell liberates fluorine as a gas at the anode, and the hydrogen ions migrate through barrier 48 (which in this embodiment is preferably a macroporous diaphragm) together with some HF and into the ionic, aqueous solution. The hydrogen ions combine with the anions produced at the cathode to form water. This is ionically a balanced system. Elemental fluorine thus formed at the anode is withdrawn from the cell through outlet port 32 while the water product together with some HF, both now segregated from the halogen acid by the diaphragm, are withdrawn along with the solution in a continuous stream from outlet port 56. The continuous flow of HF through the diaphragm and into the interspace between the diaphragm and cathode provides the necessary electrical continuity thereafter. The HF in the effluent from port 32 can be recovered and reintroduced into cell body 20 according to known techniques.

The operation of the embodiment shown in FIGURE 2 is quite similar. For instance, where it is desired to employ this embodiment for the manufacture of chlorine from hydrogen chloride, a highly concentrated hydrochloric acid solution is fed into the interior of the cell body through inlet port 30. As with the operation previously described, an oxidizing gas is fed into the internal cathode space 44 and a direct electrical current is impressed upon the cell through rod 36 and tube 46. Because of the proximity of membrane 48 to the cathode in this embodiment, there is no problem of maintaining electrical continuity therebetween. As in the operation of the embodiment of FIGURE 1, the oxygen at the cathode is formed into hydroxyl ions and simultaneously the passage of current through the cell liberates chlorine as a gas at the anode while hydrogen ions move through the membrane to combine with the hydroxyl ions thereby forming water at the cathode-membrane interface. Elemental chlorine is withdrawn from the cell through outlet port 32, the continuous stream of oxidant gas into the cathode evaporating the water product therefrom and removing it as an effluent vapor.

In the standard electrolysis of a halogen acid, the half-cell reactions can be expressed as follows, where X represents the halogen:

At the anode,

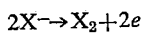

$$2X^- \rightarrow X_2 + 2e$$

At the cathode,

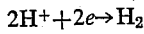

$$2H^+ + 2e \rightarrow H_2$$

where X is chlorine, the anode reaction potential in an acid medium requires 1.36 volts, the normal cathode reaction being the reference voltage. The total reaction, $2X^- + 2H^+ \rightarrow H_2 + X_2$ then requires 1.36 volts where X is chlorine, and 2.85 volts where X is fluorine, overvoltage being neglected.

On the other hand, in the process of the present invention, while the anode reaction remains the same, the cathode reaction may be expressed as

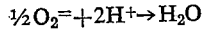

$$\tfrac{1}{2}O_2^= + 2H^+ \rightarrow H_2O$$

This cathode reaction produces theoretically 1.23 volts; hence, again neglecting overvoltage, the total reaction

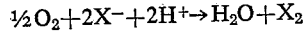

$$\tfrac{1}{2}O_2 + 2X^- + 2H^+ \rightarrow H_2O + X_2$$

requires theoretically only 0.13 volt where X is chlorine, and 1.62 volts where X is fluorine.

The saving offered by the present invention in electrical energy required is immediately apparent; the cathode reaction thus produces a portion of the power employed in the electrolysis of the acid. Additionally, the product of standard electrolysis poses the problem of explosive recombination. In the invention described, as in the prior art, the electrolysis of HF must be done under substantially anhydrous conditions. The presence of water in the electrolyte results in the formation of oxygen difluoride which represents a substantial explosion hazard. However, the present invention obviates such problems by incorporation of a cation-permeable barrier through which the hydrogen ions formed in the process are free to pass and combine with the oxygen introduced into the cathode. This not only prevents the formation of gaseous hydrogen, but also effectively bars contamination, by either the water product of the cell or oxygen from the cathode, of the halogen acid which is being processed.

While the presence of water does not pose the hazard with hydrochloric acid as presented with hydrogen fluoride, nevertheless it may be desirable to employ an ion-permeable membrane, as heretofore described, as barrier 48 to avoid inadvertent introduction of gaseous oxygen into the hydrochloric acid solution, as well as to prevent undue dilution of the latter by water formed in the process. Of course, substantial amounts of water in the electrolyte will result in the formation of chlorine-oxygen complexes such as perchloric acid which is an undesirable contaminant. Where, however, the primary concern is power saving and contamination is considered an acceptable hazard, it is understood that the invention need not include barrier 48.

Referring now to FIGURE 3, there is shown yet another embodiment of the present invention wherein, with reference to the forms shown in FIGURES 1 and 2, like numerals denote like parts. This embodiment also, in in the form shown, comprises container or cell body 20, one end of which is closed or capped with gasketed lid 22. Extending through an aperture in lid 22 and into cell body 20 is anode support means, such as rod 36, the latter having suspended therefrom tubular anode 40. Disposed coaxially within anode 40 in spaced relation therefrom is cathode 43. Positioned substantially coaxially with and between both the cathode and anode is a selectively ion-permeable barrier such as cation-exchange membrane 48, shown in exaggerated dimension for the sake of clarity. In the preferred form, cathode 42 (FIGURE 2) is a mesh cylinder having interstices large enough to allow reasonably free circulation of a fluid therethrough. Cathode 43 is formed of an electrically conductive substance, preferably of a thin film of a noble metal such as platinum, iridium, gold, etc., coated upon an electrolytic valve metal such as columbium, titanium, tantalum, or the like. Membrane 48 is located in intimate physical and electronic contact with the outer periphery of cathode 43. Thus, the cathode serves a further purpose in providing means for supporting the membrane.

Means, such as divider 80, are provided for partitioning the interior of the cathode to insure that a continuous flow of fluid can occur through the cathode interior without stagnation from "dead" areas. In order that there be a free flow of fluid in and out of the interior of the cathode, inlet means such as pipe 62 are provided communicating with a portion of the cathode interior. Similar outlet means such as pipe 64 communicate with another portion of the cathode interior. Motive means, for instance pump 66, are preferably provided to impel fluid through pipe 62, into the cathode interior and out of pipe 64.

In this embodiment, the consumption of oxidant gas is not intended to occur at the cathode. Instead, a so-called "Redox" electrode is employed, such an electrode being defined as a combination of an electrolyte solution in contact with a suitable electronic conductor, the solution containing both the reduced and oxidized forms of an "ionic" species (i.e., either or both of the two forms being ionic); the reduced form being capable of being oxidized by an oxidant gas to form the oxidized form. Such an electrolyte thus, in effect, includes an intermediate oxidant based upon a couple reaction such as the bromide-bromine couple. Other oxidant couples which are similarly applicable may be mentioned: $I_2$—$I^-$, $SO_2$—$SO_4^=$, $Fe^{+3}$—$Fe^{+2}$, $Ce^{+4}$—$Ce^{+3}$, etc. In the use of a "Redox" type of electrode, the reduction of the bromine to bromide at the cathode produces power and the spent electrolyte is regenerated outside of the cell proper by oxidizing the bromide to bromine with oxygen or air. Hence, this embodiment of the invention includes an electrolyte or catholyte in contact with the cathode, the catholyte having an intermediate oxidant such as bromine included therein. The apparatus shown in FIGURE 3 also includes a regeneration tank 68 into which oxygen is intended to be introduced to regenerate the spent intermediate.

In operation, for instance in the production of chlorine from hydrogen chloride, a concentrated hydrochloric acid solution is fed into the cell through inlet port 30. A catholyte containing bromine and bromide is introduced into the cathode chamber through pipe 62. Current passed through the cell between the anode and cathode liberates gaseous chlorine at the anode, the chlorine being vented through outlet port 32. Bromine in contact with the interior of the cathode is reduced to the bromide ion and combines with hydrogen ions which have moved through the membrane from the acid solution, thereby forming hydrogen bromide. The reduction of the bromine picks up electrons which contribute materially to the power consumed in the production of the elemental chlorine. Because of the action of pump 66, the cathode is continuously supplied with a fresh source of bromine while the hydrogen bromide is swept out of the cathode chamber through pipe 64 and into the regeneration chamber or tank 68 wherein oxygen bubbled through the hydrogen bromide oxidizes the bromide to produce water and bromine which latter is then available for recycling. This latter reaction can be expressed as

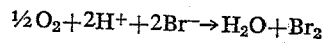

and is, as well known in the art, preferably catalyzed by $NO_2$. Among the advantages of the embodiment of FIGURE 3 are the increased efficiency of the oxidation reaction, the "Redox" electrode being somewhat superior in this respect to catalytic oxidation processes heretofore described. Further, there is no need for expensive catalysts, nor need the cathode assume a microporous form. The cathode reaction may be expressed as

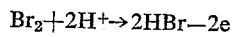

while the overall reaction can again be written as

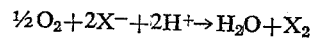

where X is chlorine; the bromine-bromide couple can be considered the analog of the catalyst in the other processes described which employ microporous, catalyzed electrodes.

The electrical power saving gained in the process of the present invention with respect to the prior art is shown in the following examples:

*Example 1*

A 3 N HCl solution was introduced into a cell similar to that shown in FIGURE 1, the cathode being formed of a microporous graphite with a mixed Pt-Rh catalyst (4 g./sq. ft.). Upon introduction of only substantially pure nitrogen into the cathode, the observed voltage was 1.5 volts at current densities of 20 ma./cm.$^2$, evolution of chlorine being observed at the anode. The ambient temperature of the cell was 40° C. to 50° C. Upon introduction of air under pressure into the cathode, and under similar conditions of temperature, evolution of chlorine was observed at the anode at a voltage of 1.0 volt at current densities of 20 ma./cm.$^2$. The energy saving is thus established at 0.5–0.6 volt. The anode employed in both runs was graphite.

*Example 2*

A mixture of anhydrous HF with approximately 10% KF was introduced into a cell similar to that shown in FIGURE 1. With nitrogen only introduced into the cathode, evolution of fluorine occurred at the anode at a potential of 2.9 volts at 20 ma./cm.$^2$; with air introduced into the cathode at the same current density, the potential required to evolve fluorine was 2.2–2.4 volts.

*Example 3*

A 3 N HCl solution was introduced into a cell such as shown in FIGURE 3. The cathode was formed of a screen of platinized titanium and supported a cationic-permeable membrance of the sulfonated polystyrene type. An aqueous solution containing 0.5 molal of bromine and 1 molal hydrobromic acid was pumped into the catholyte compartment from the regeneration tank at a flow rate of 2 milliliters per minute. A voltage of 0.7 volt at a current density of 20 ma./cm.$^2$ was impressed on the cell. For regenerating the spent oxidant couple of bromine-bromide, oxygen gas was fed to the regeneration tank at a rate of 100 ml. $O_2$ per minute. The regeneration reaction temperature was maintained at about 65° C. The overall entire system was at atmospheric pressure. Under these conditions, which include other variables obviously within the skill of one working in this art, such as electrolyte feed rates, cathode porosity, water removal rate, dimensions of the cell, the evolution of chlorine gas was observed at the anode and vented therefrom. The energy savings compared very favorably with those of Examples 1 and 2 above.

It is understood that the present disclosure is for the purpose of illustration only and that this invention includes all modification and equivalents which fall within the scope of the appended claims.

What is claimed is:

1. A process for producing a halogen gas from an acid selected from the group consisting of aqueous HCl and anhydrous HF in an electrolytic cell having spaced cathode and anode means separated by a membrane forming cathode and anode chambers, respectively, the steps comprising: introducing said acid into the anode chamber, passing an aqueous solution of an oxidant couple into the cathode chamber and retaining an effluent therefrom, simultaneously passing a direct electric current from said anode to said cathode through said cell to cause an ionic chemical reduction of said oxidant couple in said cathode chamber, supplying an oxidizing gas to the effluent of said cathode chamber to oxidize the reduced ions of said oxidant couple, recycling the regenerated oxidized couple to the cathode chamber, and removing the halogen gas from said anode chamber.

2. The process of claim 1 wherein said oxidant couple is a bromine-bromide system and said oxidizing gas is oxygen.

3. The process of claim 1 wherein the membrane is a cation-exchange membrane.

References Cited by the Examiner

UNITED STATES PATENTS 2,034,458  3/1936  Calcott et al. _____ 204—59
2,967,807  1/1961  Osborne et al. ____ 204—128 X

FOREIGN PATENTS 312,598  5/1929  Great Britain.
348,792  5/1931  Great Britain.

OTHER REFERENCES

Ephraim, Fritz: Inorganic Chemistry, Nordeman Publishing Co., Inc., New York, N.Y., 1943, page 165.

JOHN H. MACK, *Primary Examiner*.

H. M. FLOURNOY, *Assistant Examiner*.